US012226778B2

(12) United States Patent
Belz et al.

(10) Patent No.: US 12,226,778 B2
(45) Date of Patent: Feb. 18, 2025

(54) FLUID TRANSFER DEVICE AND METHOD FOR INTERCONNECTING VESSELS

(71) Applicant: Roche Molecular Systems, Inc., Pleasanton, CA (US)

(72) Inventors: Renato Belz, Rothenburg (CH); Thomas Huber, Stans (CH); Bertin Lukas Runkel, Lucerne (CH); Matthias Truessel, Knonau (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 58 days.

(21) Appl. No.: 17/467,869

(22) Filed: Sep. 7, 2021

(65) Prior Publication Data

US 2022/0072555 A1 Mar. 10, 2022

(30) Foreign Application Priority Data

Sep. 10, 2020 (EP) .................................... 20195525

(51) Int. Cl.
*B01L 3/00* (2006.01)

(52) U.S. Cl.
CPC ............. *B01L 3/5635* (2013.01); *B01L 3/565* (2013.01); *B01L 2200/023* (2013.01);
(Continued)

(58) Field of Classification Search
CPC .. B01L 3/5635; B01L 3/565; B01L 2200/023; B01L 2200/026;
(Continued)

(56) References Cited

U.S. PATENT DOCUMENTS

| | | | | |
|---|---|---|---|---|
| 6,398,705 | B1 * | 6/2002 | Grumberg | G01N 33/491 494/47 |
| 2004/0112457 | A1 | 6/2004 | Norton et al. | |
| 2018/0296748 | A1 * | 10/2018 | Emerson | A61J 1/2013 |

FOREIGN PATENT DOCUMENTS

| | | | |
|---|---|---|---|
| EP | 0850178 | B1 | 11/1999 |

OTHER PUBLICATIONS

European Extended Search Report for EP Application No. 20195525.9 mailed on Feb. 26, 2021.

* cited by examiner

*Primary Examiner* — Jill A Warden
*Assistant Examiner* — Alex Ramirez

(57) ABSTRACT

The present invention provides for a fluid transfer device for interconnecting vessels, the fluid transfer device comprising a main body with a first body part providing a first hollow interior merging into a first open end for receiving a fluid obtaining vessel, and a second body part providing a second hollow interior merging into a second open end for receiving a fluid supplying vessel, a connection assembly with a double-ended cannula for connecting the first hollow interior with the second hollow interior, and a first encasing member encasing a first cannula part arranged within the first hollow interior, and an actuating member provided inside the first hollow interior, wherein the actuating member is movably arranged along a longitudinal axis of the first body part, and wherein the actuating member is in contact with the first encasing member for piercing the first encasing member by the cannula during a movement of the actuating member towards the second body part. Furthermore, the present invention provides for the use of such fluid transfer device for venting a fluid supplying vessel and/or interconnecting vessels, as well as for a respective method.

15 Claims, 9 Drawing Sheets

(52) U.S. Cl.
CPC .................... *B01L 2200/026* (2013.01); *B01L 2200/0684* (2013.01); *B01L 2200/0689* (2013.01); *B01L 2200/082* (2013.01); *B01L 2300/0672* (2013.01)

(58) Field of Classification Search
CPC ..... B01L 2200/0684; B01L 2200/0689; B01L 2200/082; B01L 2300/0672
See application file for complete search history.

FLUID TRANSFER DEVICE AND METHOD FOR INTERCONNECTING VESSELS

CROSS REFERENCE TO RELATED APPLICATIONS

This application claims the benefit of priority to European Application No. EP 20195525.9, filed on Sep. 10, 2020, the content of which is incorporated by reference herein in its entirety.

TECHNICAL FIELD

In general, the present invention relates to the field of medical technology, and in more detail to medical laboratory equipment. In particular, the present invention describes a new kind of fluid transfer device, which fluid transfer device is usually used for fluid transfer between fluid vessels, wherein the focus of the present invention lies on a fluid transfer device and a respective method for safely interconnecting different fluid vessels in order to transfer fluid, e.g. blood culture samples, from one vessel to another. In this regard, since health care workers handling fluid samples are routinely exposed to severe dangers from inadvertent contact with contaminated needles or exposure to contaminated bodily fluids, the general need exists to be able to transfer fluid from one vessel to another without causing harm to a user or to the environment.

BACKGROUND

In the field of medical technology, and in particular during pre-analytical workflow, fluids, such as blood or other bodily fluids collected from a patient, are commonly to be transferred from e.g. a blood culture bottle, also referred to as “BCB”, to a often vacuumized blood collection tube, also referred to as “BCT”. To this effect, it is often desired to transfer the fluids collected from a patient to one or more vessels or receptacles, e.g. to be stored or to be taken to a lab for testing, i.e. for pre-analytical sample transfer. In this respect, even though BCTs have already undergone certain standardization procedures which resulted in a commonly used standardized type of BCT, only a part of available BCBs have undergone such standardization, resulting in the availability of various kinds of BCBs differing in size and type. With reference to FIGS. 5*a* to 5*c*, in this order, three different kinds of known BCBs are depicted as examples, i.e. a BCB 91 with a long and thin bottle neck 911, a BCB 92 with a short bottle neck 921, or a BCB 93 with a wide and short bottle neck 931. An example for a BCB 91 with a long and thin bottle neck 911 is a Becton Dickinson BD BACTEC™ bottle, an example for a BCB 92 with a short bottle neck 921 as depicted in FIG. 5*b* is a bioMerieux BACT/ALERT® culture media bottle, and an example for a BCB 93 with a wide and short bottle neck 931 is a Thermo Fisher Thermo Scientific™ VersaTREK™ bottle. Further, an example of a standard BCT is a Greiner Bio-One Vacuette® tube or a BD Vacutainer® tube.

In regard to the general structure of a BCB or BCT vessel, it is well known to cover the entry portion of such vessels with a cap comprising a pierceable rubber septum sealing the entry portion, in order to facilitate fluid transfer to and from the vessel, wherein the septum can be pierced by a needle or cannula of a fluid collecting device, such as a medical syringe, in order to safely transfer fluid to or from the vessel without the necessity to open the same and expose its content to the environment. Accordingly, in order to cover the entry portion of the respective bottle neck 911, 921, 931, each one of the BCBs 91, 92, 93 is equipped with a cap comprising a pierceable septum 912, 922, 932 for sealing the opening at the bottle neck 911, 921, 931. As already described above, the septum 912, 922, 932 can be pierced by a needle or cannula of a medical syringe or the like, for drawing the usually fluid content from the BCB 91, 92, 93. Such content, often in the form of blood culture samples, can then be safely transferred to a receptacle, such as a common test tube, a standardized BCT, or the like, by means of the syringe. When the needle of the syringe is withdrawn from the pierceable septum 912, 922, 932 after drawing its fluid content, the resilient septum 912, 922, 932 of the BCB 91, 92, 93 has the capability to reseal itself and separate the vessel’s inside from its outside, thereby preventing any fluid from unintentionally escaping the BCB 91, 92, 93 and also preventing contaminants from entering the inside of the BCB 91, 92, 93.

However, using a medical syringe in order to transfer fluid from a BCB to a test tube or the like requires several procedural steps and is, thus, rather cumbersome and time consuming. In order to provide a faster approach for transferring fluid from a BCB to e.g. a standardized BCT, connection devices for establishing a connection between a BCB and a BCT have already been suggested in the past: As an example, it is referred to EP 0 850 178 B1 in which a connection device for snap-fit connection on a particular kind of BCB is suggested, which connection device includes a double-ended cannula for simultaneously piercing a septum of the BCB and a septum of a BCT when introducing the BCT into an opening of the connection device, which is possible only after removal of a safety cap. Also, another kind of connection device is known in the present technical field of medical laboratory equipment from ITL BioMedical’s Transfer Cap Set (https://www.itlbiomedical.com/product/transfer-cap-set), which connection device can be placed with its one side onto a BCB, including piercing the septum of the blood culture bottle with a plastic safety tip, and at its other side, a BCT can be docked. In doing so, the BCT can be pierced by its plastic cannula covered by means of a rubber jacket, and a fluid connection can be established between the BCB and the BCT.

With the already known BCB-to-BCT connection devices, however, several disadvantages can occur compared to the long-known use of a medical syringe for fluid transfer from vessel to vessel. For one, only one particularly predetermined kind of BCB can be connected to the known connection device, reducing its usability to only one particular BCB selected from the various different kinds of BCBs available on the market, thereby limiting the scope of application of such connection device significantly. Further, it has been found that a blood culture residing inside a BCB can produce overpressure during culturing. This overpressure—when piercing the septum of the BCB—can result in undesired spurting of blood culture out of the BCB and, thus, contamination of a user with the blood culture. Such contamination of a user caused by potential overpressure should be prevented in order to avoid any harm to the user. Additionally, and in regard to the general avoidance of danger to a user, the user must also be protected from any kind of potential harm directly originating from the connection device itself, such as piercing accidents caused by a needle or the like. Here, serious health risks can be encountered by the user when the needle of a fluid connection device accidentally pierces the user’s skin, due to the fact that blood cultures can gain access to the body of the user and contaminate the same.

Thus, in the present technical field, the need exists to provide a fluid transfer device for interconnecting different BCBs with BCTs, wherein the user can be protected from any potential harm.

SUMMARY OF THE INVENTION

The present invention addresses the above described problems by means of an improved fluid transfer device, its use and a respective method. According to a first aspect of the present invention, a fluid transfer device for interconnecting vessels is provided, also referred to as sample transfer adapter ("STA") or blood culture sample transfer adapter, wherein the fluid transfer device comprises a main body with a first body part providing a first hollow interior merging into a first open end for receiving a fluid obtaining vessel, such as a blood collection tube BCT, and a second body part providing a second hollow interior merging into a second open end for receiving a fluid supplying vessel, such as a vial, for example in the form of a blood culture bottle BCB. Furthermore, the fluid transfer device comprises a connection assembly with a double-ended cannula for basically connecting the first hollow interior with/to the second hollow interior, and a first encasing member encasing a first cannula part of the double-ended cannula, which first cannula part is arranged within the first hollow interior. Moreover, the fluid transfer device comprises an actuating member provided inside the first hollow interior and around the first cannula part, wherein the actuating member is movably arranged along a longitudinal axis of the first body part, and wherein the actuating member is in contact with the first encasing member for piercing the first encasing member by the respective tip of the cannula during a movement of the actuating member towards the second body part. Accordingly, the actuating member can be moved inside the first body part, i.e. inside the first hollow interior, relative to the first body part and, thus, relative to the main body and the connection assembly of the fluid transfer device. Also, the movement of the actuating member within the first hollow interior can be restricted by means of a stopper riding in a notch provided in the first body part, the notch having a predetermined length. Thereby, the actuating member can be held within the first hollow interior after assembling the fluid transfer device of the present invention, i.e. the actuating member can be prevented from accidentally falling out of the first hollow interior, and its movement can be restricted to a certain range of axial movement. Based thereon, and since the actuating member is arranged inside the first hollow interior, the fluid obtaining vessel to be received by the first body part and its first hollow interior is basically received and docked/coupled by means of the actuating member within the first body part. Thereby, and in view of the movability of the actuating member within the first body part, the fluid transfer device of the present invention exhibits an inherent property of being able to move the fluid obtaining vessel relative to the main body and the connection assembly, i.e. relative to any statically docked fluid supplying vessel.

Accordingly, the fluid transfer device of the present invention basically consists of two sides, i.e. a BCT side interface portion in the form of the first body part with its first hollow interior and the actuating member for receiving and temporarily accommodating a BCT, or at least a septum-sealed part of the BCT, and a BCB side interface portion in the form of the second body part with its second hollow interior for receiving and temporarily accommodating a BCB, or at least a septum-sealed neck part of the BCB. Thus, the fluid transfer device of the present invention is basically divided into the first body part and the second body part by means of a common partitioning wall holding the connection assembly, resulting in a clear spatial division of the fluid transfer device into its BCT side interface portion and its BCB side interface portion. Now, in order to be able to transfer fluid between the two interface portions of the fluid transfer device, i.e. establish a fluid transfer between the first and the second hollow interior, or vice versa, the connection assembly of the fluid transfer device provides for a hollow cannula or hollow needle with two open ends, i.e. a double-ended cannula, wherein the continuous interior of the cannula can connect the first and the second hollow interior. The part of the cannula arranged within the first hollow interior, i.e. the first cannula part, is encased or covered by the first encasing member which can be implemented in the form of a protective resilient sleeve or envelope, preferably made of rubber, such as ethylene propylene diene monomer (EPDM) rubber or liquid silicone rubber (LSR). As alternative materials for any rubber encasing member, Kraiburg Thermolast TM3RST translucent, Kraiburg Thermolast TM4RST translucent, Kraiburg Thermolast TM3MED translucent, Kraiburg Thermolast TM4MED translucent, Kraiburg Thermolast TM3LFT translucent or Kraiburg Thermolast TM4LFT translucent can be used.

With the above described resilient first encasing member, a user can be protected from injury by the tip of the first cannula part, and undesired discharge of fluid, e.g. spurting/spraying or dripping of fluid, from the cannula can be prevented. Such spurting of fluid can occur, for example, after a BCB is docked, i.e. inserted into the second hollow interior and connected to the second cannula part, whereby a connection from the interior of the BCB to the outside is substantially established. In particular, a blood culture residing inside the BCB can produce overpressure during culturing, which overpressure—when piercing the septum of the cap of the BCB by means of the tip of the second cannula part—can result in a sudden pressure release due to ejection of a part of the fluid content of the BCB out of the vessel, e.g. compressed air and/or blood culture, through the second cannula part into the first cannula part, and out of the first cannula part towards the first open end of the first body part. Here, the ejected fluid content of the BCB can be received by the resilient first encasing member. Thus, the first encasing member achieves, inter alia, preventing the ejected fluid from entering the first hollow interior and, thereby, from potentially spraying the same towards a user. Also, due to the resilience of the first encasing member, the same can automatically restore its original form after being pierced. That is, after venting or after removal of a BCT from the first body part, the encasing member can immediately re-encase the tip of the first cannula part, thereby preventing dripping of residual fluid remaining in the first cannula part from the fluid transfer device.

Also, the fluid transfer device of the present invention comprises the actuating member arranged inside the first hollow interior in a slidable manner movable along a longitudinal axis of the first body part. Since the actuating member is in contact with the first encasing member, for example by seat-engaging contact, the actuating member which can be provided in a manner to be operable from the outside of the fluid transfer device, such as in a manual manner by a user, can actuate the first encasing member by deformingly compressing or collapsing the same, urging the tip of the first encasing member towards the tip of the first cannula part. Here, the actuating member can be in contact with the first encasing member by means of a projection laterally projecting from the first encasing member to the outside, for example in a disc-like manner, rendering the first encasing member's projection to be a driving disc. Such disc-like projection, which can be an integral part of the first encasing member or a separate part attached thereto, can be arranged closer to a tip part of the first encasing member than its base part or socket, which socket of the first encasing member can be arranged close to or at the common partitioning wall. Also, in order to provide additional stability to the disc-like projection, the same can incorporate a disc-like body made of a rigid material, such as a metal disc or the like. With such structure, the previously mentioned seat-engaging contact between actuating member and first encasing member can be implemented, wherein the actuating member and the first encasing member are only loosely in contact with each other. With such loose contact or separable attachment, a movement of the actuating member in a direction towards the common partitioning wall and the second body part results in an entrained movement of the driving disc and, thus, the tip of the first encasing member is urged towards the socket of the first encasing member, whereas the actuating member—in principle—can move in the other direction without the driving disc being moved. Alternatively, the actuating member can be connected to the first encasing member in a fixedly manner or the like. One way or the other, a mutual movement of the actuating member and the first encasing member at least in one common direction can be achieved. With such mutual movement in one common direction, the first encasing member is pushed together, for example in a bellows-like manner. Thereby, the first encasing member can be urged onto and over the tip of the first cannula part, i.e. can be pierced by means of the tip of the first cannula part during a collapsing movement caused by the pushing movement of the actuating member, thereby exposing the tip of the first cannula part to the outside. In doing so, and provided that no BCT is docked to the fluid transfer device, i.e. no BCT is inserted into the first hollow interior and connected to the first cannula part, the overpressure of a BCB as described above can be released, e.g. to the environment, in a controlled manner, also referred to as venting. Thus, the user of the fluid transfer device of the present invention is not only in the position to control the time and direction of pressure release, i.e. away from the user, but also the process of pressure release, e.g. in a stepwise manner with several small pressure-releasing venting-actions, or all at once, i.e. in the course of a one-step-release.

Based on the above, the fluid transfer device of the present invention is used to transfer liquid, such as blood, from a BCB to a BCT, and is compatible to different sizes and types of BCBs as well as to a standardized BCT. As already mentioned above and speaking in a functional manner, the fluid transfer device comprises a BCB side interface portion, a BCT side interface portion, and a common cannula with two cannula parts each exhibiting a needle tip opposite to one another, for penetrating the septum of a BCB cap and the septum of a BCT cap simultaneously, wherein at least the cannula part for piercing the BCB's septum is covered by a rubber component which serves to prevent undesired release of fluid during venting the BCB from overpressure to ambient pressure and during fluid transfer from the BCB to the BCT. Hence, during use of the fluid transfer device of the present invention, the fluid transfer device basically forms a single piece adapter having two opposing interface portions for receiving one or several BCBs and/or BCTs.

In regard to the basic operation of the fluid transfer device of the present invention, as a first operational step, the BCB is docked to the BCB side interface portion of the fluid transfer device and can be held by e.g. two or more springs aligned circumferentially inside the first hollow interior, thereby enabling a centering and holding of the cap of the BCB within the BCB side interface portion. Accordingly, the second body part of the fluid transfer device of the present invention can comprise at least two cantilever snap-fit connectors for holding an inserted BCB in place within the fluid transfer device. Additionally or alternatively, the second body part of the fluid transfer device of the present invention can comprise at least two projections for providing a centering clip, for centering the cap of the BCB within the second hollow interior. With particular view on the first operational step in further detail, the BCB can be aligned by the centering projections, for example in the form of several leaf spring members protruding inwards towards a longitudinal axis of the main body of the fluid transfer device, enabling a centering of the cap of the BCB within the BCB side interface portion, wherein the cap of the BCB can be held by at least two of the at least four springs via snap-fitting, i.e. by cantilever snap-fit connectors arranged within the BCB side interface portion next to the centering springs. Thus, with such specific design including a purpose-made inner structure of the first hollow interior of the fluid transfer device, improved bottle guidance during docking can be achieved, and a tight fit of a BCB inside the fluid transfer device can be ensured by means of the snap-fitting features, for closely attaching the BCB to the fluid transfer device and providing accommodation for different cap and neck designs of different BCBs.

By pushing the BCT side interface portion towards the BCB side interface portion and onto the BCB, the cannula of the fluid transfer device is moved towards the BCB cap and, eventually, penetrates the septum of the BCB cap, thereby generating an opening in the BCB cap and, thus, providing an outlet for any overpressure prevailing within the BCB. Then, by moving the actuating member towards the BCB, the first encasing member can be pierced by means of the tip of the first cannula part. In doing so, and provided that no BCT is yet docked to the fluid transfer device, the overpressure within the BCB can be released in a controlled manner, i.e. the BCB is vented—as usually desired- to ambient pressure. During the movement of the actuating member for piercing the first encasing member, its tip is compressed and acts as a seal around the piercing site. Also, in case the second cannula part is covered by an optional second encasing member, its tip is compressed and acts as a seal around the piercing site where the cannula has penetrated the BCB cap. In a subsequent step, a BCT can be docked to the BCT side interface portion of the fluid transfer device, and the needle penetrates the BCT cap, thereby enabling sample transfer from the BCB to the BCT. Similar to the BCB side interface portion, the tip of the first encasing member is compressed and acts as a seal around the piercing site where the cannula has penetrated the BCT cap. After sample transfer, the encasing members further act in a spring-like manner to again cover the cannula's tips after release of the BCT and/or the BCB.

The fluid transfer device of the present invention can be used in the sample transfer between different kinds of fluid supplying vessels as depicted in FIGS. 5*a* to 5*c*, i.e. BCBs comprising caps and/or necks of different sizes such as the following: A BCB 91 with a long and thin bottle neck 911 as depicted in FIG. 5*a*, wherein a suitable adapter or spacer as described further below can be used; a BCB 92 with a short bottle neck 921 as depicted in FIG. 5*b*; and/or a BCB 93 with a wide and short bottle neck 931 at the BCB side interface portion; and standard BCTs at the BCT side interface portion. Accordingly, the second body part of the fluid transfer device of the present invention is adapted to receive fluid supplying vessels of different shapes and dimensions, whereas the first body part can be shaped to receive a standardized vessel in the form of a standard BCT.

According to a specific embodiment of the fluid transfer device of the present invention, the movement of the actuating member within the first hollow interior is a sliding movement, wherein an outer wall surface of the actuating member, also referred to as outer circumference of the actuating member, is sliding along an inner wall surface of the first body part, also referred to as inner circumference of the first body part, resulting in the actuating member being an actuating slider or sliding actuator. In the present case, the actuating member as well as the first body part can exhibit compatible shapes, such as cylindrical shapes mutually mating by means of a loose fit or sliding fit due to the outer circumference of the actuating member being smaller than the opposing inner circumference of the first hollow interior of the first body part. Thus, the BCT side interface portion provides for a sliding component that can be movably positioned within the same. Therefore, during operation of the fluid transfer device, the BCT side interface portion and the BCB side interface portion, in particular the interior receiving end face of the BCT side interface portion for abutting the respective end of the BCT and the interior receiving end face of the BCB side interface portion for abutting the respective end of the BCB can move relative to each another during a movement of the sliding actuating member.

According to a further specific embodiment of the fluid transfer device of the present invention, the fluid transfer device can further comprise a spacer or spacer sleeve connectable to the second open end. During use of the fluid transfer device with the spacer, the connected spacer is used to assist the second body part in accommodating long-necked vessels, such as the BCB 91 as depicted in FIG. 5*a*. In order to connect the spacer safely to the fluid transfer device, a snap-fit connection between the spacer and the fluid transfer device can be implemented, with the spacer being inserted into the second open end and respective snap-fit features of the spacer being brought into engagement with respective counterparts provided in an upper edge of the second body part close to the second open end. As an example, two opposing snap-fit connections can be established between the spacer and the second open end.

In regard to the use of encasing members, it has already been described above that a first encasing member encasing a first cannula part is part of the fluid transfer device of the present invention, and that an optional second encasing member encasing a second cannula part can be provided as part of the fluid transfer device of the present invention. Accordingly, and in accordance with a further specific embodiment of the fluid transfer device of the present invention, the connection assembly of the fluid transfer device can not only comprise a first encasing member encasing a first cannula part arranged within the first hollow interior, but also a second encasing member encasing a second cannula part arranged within the second hollow interior. Thereby, each of the opposing tips of the double-ended cannula is covered by a respective encasing member, wherein only the first encasing member is in contact with the actuating member. Any encasing member can be attached to the cannula, i.e. the respective cannula part, by means of a force-fit connection or the like. In this regard, as an example, a base part or socket of any encasing member can be arranged close to a center part of the cannula held by the common partitioning wall of the main body. In particular, the socket of any encasing member can be arranged close to the common partitioning wall of the main body. In regard to the force-fit connection, the socket of each cannula part can comprise a projection, such as a blunt circular bulge, over which a socket of a respective encasing member can be pushed. Thereby, due to the resilience of the encasing member, a connection by press-fit is achieved, i.e. a frictional connection between the bulge of the cannula part socket and the respective part of the encasing member pushed over the bulge, in the sense of a flexible hose connection by means of a hosebarb. In further detail, any encasing member is made of resilient material, such as ethylene propylene diene monomer rubber, in short EPDM rubber, or liquid silicone rubber, in short LSR, for acting not only as a seal around a piercing site in its compressed state, and, after being released, as a flexible spring element restoring its original form for encasing a respective cannula tip and for resetting the movable slider to its initial position, but also as a means for establishing the press-fit connection with the cannula part's bulge at the socket of the respective cannula part.

According to a further specific embodiment of the fluid transfer device of the present invention, the first open end, the second open end and the connection assembly are arranged coaxially with the longitudinal axis of the main body. Accordingly, the longitudinal axis of the first open end, the second open end and the connection assembly are aligned with each other. Additionally, the actuating member can also be arranged coaxially with the longitudinal axis of the main body. In further detail, the entire fluid transfer device can be implemented as a tubular or cylindrical body, with each one of the first open end, the first body part, the partitioning wall, the second body part, the second open end, the actuating member and/or the spacer being implemented as a respective cylindrical component, wherein each one of these components can be arranged on a common longitudinal axis. Also, the connection assembly can also be arranged on the same longitudinal axis, i.e. the cannula including one or several of the encasing members can be arranged on the same longitudinal axis, thereby achieving a common center axis for the fluid transfer from the interconnected vessels. Accordingly, all components of the fluid transfer device of the present invention can share a common longitudinal axis, wherein the BCT and the BCB can also be aligned and docked along this same common longitudinal axis. With such a structure, the fluid transfer device of the present invention results in s specific design which can guarantee an ergonomic handling experience for the user.

Moreover, according to a further specified embodiment, an outer diameter of the second body part can be broadening in a direction away from the first body part and, thus, away from the partitioning wall, in order to provide additional space within the second hollow interior for accommodating e.g. a BCB with a wide and short bottle neck at the BCB side interface portion, i.e. a BCB which might require additional space. Furthermore, according to a further specified embodiment of the fluid transfer device of the present invention, the main body and the cannula of the connection assembly can be integrally manufactured, for example by injection molding. Thereby, the partitioning wall in its function as center piece and the cannula can be manufactured in one piece, as an integral part, maintaining a certain stability of the fluid transfer device and its cannula parts during docking. Also, the fluid transfer device of the present invention can be made of transparent material, wherein in particular the first body part, the second body part and/or the actuating member can be made of transparent material, in order for a user to be able to determine different states of use of the fluid transfer device, such as a docking state of BCB and/or BCT, a state of each encasing member, i.e. compressed or released state of each encasing member, and a position of the actuating member at all times. Thereby, control of an interconnecting and/or venting function of the fluid transfer device of the present invention can be closely monitored by the user.

According to a further aspect of the present invention, a certain use of a fluid transfer device as described above is suggested, wherein the fluid transfer device of the present invention is primarily intended for use for interconnecting a fluid supplying vessel, such as a vial e.g. in the form of a blood culture bottle, and a fluid obtaining vessel, such as a blood collection tube, wherein the fluid supplying vessel can vary in shape and dimension. Alternatively or additionally, the fluid transfer device of the present invention is intended for use for venting a fluid supplying vessel, such as a vial e.g. in the form of a blood culture bottle, before interconnecting a fluid obtaining vessel, such as a blood collection tube, with the fluid supplying vessel. Accordingly, the user has the option to vent a blood culture bottle by means of the fluid transfer device as described above. Additionally, if desired, the user can further use the fluid transfer device, after venting, to interconnect the vented blood culture bottle with one or several blood collection tubes. Thus, the fluid transfer device of the present invention can be used by a user in twofold manner, i.e. the fluid transfer device of the present invention can exhibit a dual-purpose by providing the possibility to (a) vent a BCB, and (b) interconnect a BCB to one or several BCTs after venting, or also without venting, as desired.

According to a further aspect of the present invention, a method for interconnecting vessels by means of a fluid transfer device as described above is also suggested, wherein the method comprises (a) a step of inserting a fluid supplying vessel, such as a vial preferably in the form of a blood culture bottle, into the second hollow interior, thereby piercing a septum of the fluid supplying vessel by means of a tip of the first cannula part arranged within the second hollow interior, and optionally piercing of an optional second encasing member encasing the second cannula part by means of a tip of the second cannula part, (b) a step of moving the actuating member towards the second body part without a fluid obtaining vessel being inserted into the first hollow interior; (c) a step of piercing the first encasing member by means of the tip of the first cannula part arranged within the first hollow interior, thereby establishing a fluid connection between an interior of the fluid supplying vessel and the outside, in order to vent the fluid supplying vessel; and —as an optional step—(d) a step of inserting a fluid obtaining vessel after venting the fluid supplying vessel, such as a blood collection tube, into the first hollow interior, and piercing a septum of the fluid obtaining vessel by means of the tip of the first cannula part within the first hollow interior, thereby establishing a fluid connection between an interior of the fluid supplying vessel and the interior of the fluid obtaining vessel. Thus, by means of the inventive method, the overpressure of a BCB as described above can be released, e.g. to the environment, in a controlled manner, before connecting the same to a BCT. Thus, the user is in the position to control a process of pressure release from the BCB, in particular before docking a BCT to the fluid transfer device.

According to a specific embodiment of the method for interconnecting vessels of the present invention as described above, after removal of the fluid supplying vessel and/or the fluid obtaining vessel from the fluid transfer device, a respective encasing member automatically restores its original form by resilience, thereby encasing, or better re-encasing, a respective cannula tip. Accordingly, any one of respective encasing members can automatically restore its original shape after being pierced, thereby preventing a user from potential harm caused by an exposed cannula tip, since serious health risks can occur when a user is accidentally punctured by the exposed cannula tip. Also, by automatically restoring its original shape, each encasing member can prevent undesired dripping of residual content remaining in the cannula after use. Furthermore, with the first cannula part being arranged within the first hollow interior being covered by the first encasing member, and with the first encasing member being in contact with the actuating member e.g. by means of a seat engagement with a disc-like projection of the first encasing member, the automatically restoring of the first encasing member can result in returning the actuating member into its initial position, i.e. the position before any use of the fluid transfer device of the present invention.

Moreover, and according to a further specific embodiment of the method for interconnecting vessels of the present invention, a spacer can be connected to the second open end before inserting a fluid supplying vessel into the second hollow interior, wherein the spacer can be connected to the fluid transfer device by means of a snap-fit connection or the like. In further detail, one or several snap-fit features or snap-fit joints of the spacer can be inserted into respective slots, with the slots and joints being provided in an opposing manner or in a circumferentially equidistantly arranged manner. In doing so, accommodating particularly shaped fluid supplying vessels, such as long-necked BCBs, can be achieved, wherein the spacer extends the second body part and its second hollow interior in a way such that the long-necked BCB can be guided and supported in a safe and secure manner for docking with the fluid transfer device.

In other words, in general, the fluid transfer device of the present invention, which can also be referred to as sample transfer adapter "STA" or blood culture sample transfer adapter, is used either for venting BCBs of different kinds, and/or for sample transfer between BCBs with a short neck, BCBs with a wide and short neck, or BCBs with a long and thin neck, and a standard BCT, wherein the components of the fluid transfer device are assembled into one piece for easier handling before use. In particular, the fluid transfer device of the present invention can be divided into two interface portions on either side of the fluid transfer device: one interface portion for the BCB, i.e. a BCB side interface portion, and another interface portion for the BCT, i.e. a BCT side interface portion. Furthermore, a cannula or needle is housed within the fluid transfer device, which cannula exhibits two sharp ends or tips for piercing a cap of the BCB and a cap of the BCT, respectively, or better a respective septum of each cap. One or each tip of the double-ended cannula can be covered with a rubber sleeve that serves to protect the user from injury and prevents spilling of fluid, e.g. dripping of sample fluid after removal of the respective receptacle, i.e. BCB and/or BCT. Here, the rubber sleeve of the needle on the BCT side, i.e. at the BCT side interface portion, can include a projection in the form of a driving disc, e.g. in the form of a rubber disc integrally formed with the rubber sleeve. The BCT side interface portion further comprises a sliding component in the form of an actuating member or "slider" arranged therein, which component is movably positioned and is in contact with the driving disc. During operation of the fluid transfer device, and by means of the movable actuating member which serves for receiving the BCT, both interface portions can move relatively towards one another. In more detail, during operation of the fluid transfer device of the present invention, a first operational step is docking the BCB to the BCB side interface portion of the fluid transfer device. In doing so, the BCB can be aligned circumferentially by e.g. two snap-fit connectors and e.g. two spring-like projections enabling centering the cap of the BCB within the BCB side interface portion, wherein the BCB can be held by the two snap-fit connectors after docking. By pushing the movable slider towards the BCB side interface portion, the respective rubber sleeve is compressed by means of the driving disc, thus being pierced by the respective tip of the cannula and exposing the same on the BCT side, thereby venting the BCB, i.e. releasing overpressure from the BCB. In a second operational step, the BCT is docked to the BCT side interface portion of the fluid transfer device, and the other tip of the double-ended cannula pierces the BCT cap, i.e. the cap's septum, thereby enabling sample transfer from the BCB to the BCT. After sample transfer, and after release of the BCT and/or the BCB, the one or more rubber sleeves assume its original form in a spring-like manner to again cover the respective cannula tip. Also, on the BCT side, the driving disc connected to the rubber sleeve assuming its original form assists in resetting the movable slider to its initial position within the BCT side interface portion of the fluid transfer device of the present invention.

As used herein and also in the appended claims, the singular forms "a", "an", and "the" include plural reference unless the context clearly dictates otherwise. Similarly, the words "comprise", "contain" and "encompass" are to be interpreted inclusively rather than exclusively, that is to say, in the sense of "including, but not limited to". The terms "plurality", "multiple" or "multitude" refer to two or more, i.e. 2 or >2, with integer multiples, wherein the terms "single" or "sole" refer to one, i.e. =1. Furthermore, the term "at least one" is to be understood as one or more, i.e. 1 or >1, also with integer multiples. Accordingly, words using the singular or plural number also include the plural and singular number, respectively. Additionally, the words "herein," "above,", "previously" and "below" and words of similar import, when used in this specification, shall refer to this specification as a whole and not to any particular portions of the specification.

Furthermore, certain terms are used for reasons of convenience and are not intended to limit the present invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein are to be interpreted accordingly.

To avoid repetition in the figures and the descriptions of the various aspects and illustrative embodiments, it should be understood that many features are common to many aspects and embodiments. The description of specific embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure as defined by the appended claims, as those skilled in the relevant art will recognize. Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure as defined by the appended claims. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for the reason of lucidity, if in a section of a drawing not all features of a part are provided with reference signs, it is referred to other sections of the same drawing. Like numbers in two or more figures represent the same or similar elements.

The following examples are intended to illustrate various specific embodiments of the present invention. As such, the specific modifications as discussed hereinafter are not to be construed as limitations on the scope of the present invention. It will be apparent to the person skilled in the art that various equivalents, changes, and modifications may be made without departing from the scope of the present invention, and it is thus to be understood that such equivalent embodiments are to be included herein. Further aspects and advantages of the present invention will become apparent from the following description of particular embodiments illustrated in the figures.

LIST OF REFERENCE NUMERALS

Figure 1:
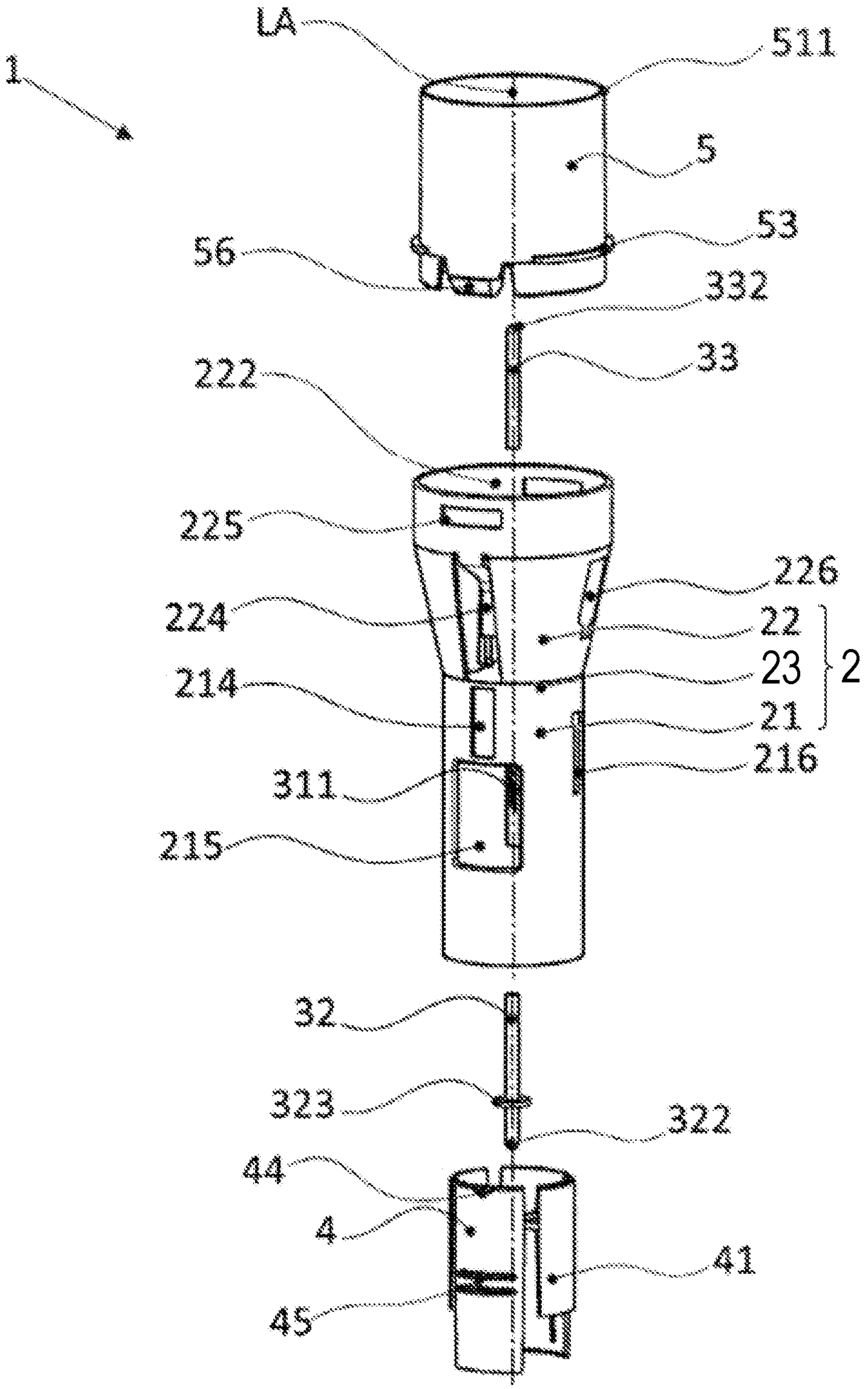
FIG. 1 is an exploded schematic illustration of a fluid transfer device according to an embodiment of the present invention in a perspective view.

1 fluid transfer device
2 main body
21 first body part
211 first hollow interior
212 first open end
213 guide rail
214 notch
215 access window
216 BCT side indicator
22 second body part
221 second hollow interior
222 second open end
223 snap-fit connector
224 centering projection
225 slot for snap-fit connection
226 BCB side indicator
23 partitioning wall
3 connection assembly
31 double-ended cannula
311 first cannula part
3111 first cannula part's bulge
3112 first cannula part's tip
312 second cannula part
3121 second cannula part's bulge
3122 second cannula part's tip
32 first encasing member
321 first encasing member's socket
322 first encasing member's tip
323 disc-like projection
33 second encasing member
331 second encasing member's socket
332 second encasing member's tip
4 actuating member
41 actuating member's outer wall
42 abutting wall
421 actuating member's through-hole
422 actuating member's seat
43 guide rail
44 stopper
45 grip enhancer
5 spacer
51 spacer's outer wall
511 outer seat
52 inner wall
53 outer rim
54 connecting wall
55 spacer's through-hole
56 snap-fit feature
8 BCT
81 septum
91 BCB with a long and thin bottle neck
911 bottle neck
912 septum
92 BCB with a short bottle neck
921 bottle neck
922 septum
93 BCB with a wide and short bottle neck
931 bottle neck
932 septum
LA common longitudinal axis

DETAILED DESCRIPTION

Figure 2:
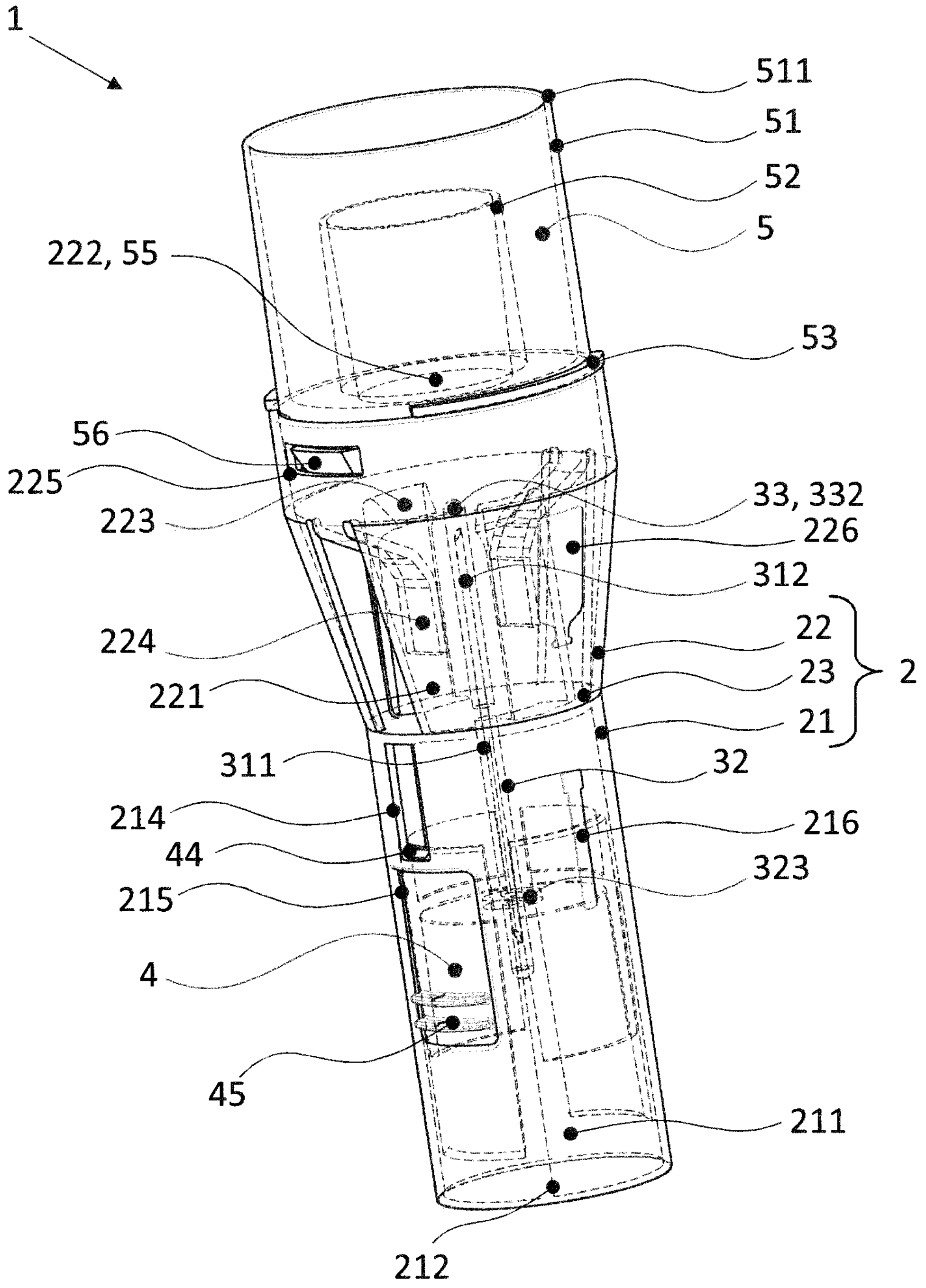
FIG. 2 is a schematic perspective illustration of the fluid transfer device as depicted in FIG. 1 in a perspective view.

FIG. 1 shows a fluid transfer device 1 according to an embodiment of the present invention in an exploded perspective view, and FIG. 2 shows the fluid transfer device 1 of FIG. 1 in a perspective view in an assembled manner, with the interior of the fluid transfer device 1 illustrated in a see-through manner by means of dashed lines. In general, the fluid transfer device 1 of the present invention basically comprises a main body 2, a connection assembly 3, an actuating member 4 and, as a removable component for optional use in case of the necessity of lengthwise extension for additional support, a spacer 5.

The main body 2 of the fluid transfer device 1 includes a first body part 21 and a second body part 22, which body parts 21, 22 are separated by a common partitioning wall 23. In the presently described embodiment, the first body part 21, the second body part 22 and the partitioning wall 23 are integral components of the main body 2 of the fluid transfer device 1. Further, the first body part 21 and the second body part 22 are both cylindrical components. In this regard, the first body part 21 comprises a hollow interior, also referred to as first hollow interior 211, which is defined by the partitioning wall 23 on one side and by an open end at the other side, also referred to as first open end 212. Similarly thereto, the second body part 22 comprises a hollow interior, also referred to as second hollow interior 221, which is defined by the partitioning wall 23 on one side and by an open end at the other side, also referred to as second open end 222.

The first open end 212 and, in its extension towards the partitioning wall 23, the first hollow interior 211 can also be referred to as BCT side of the fluid transfer device, since both the first open end 212 and the first hollow interior 211 are intended to receive a standard BCT. Thus, in view of such standard BCT and its tubular shape with a usually constant outer diameter, the first open end 212 and the first hollow interior 211 basically exhibit the same constant inner diameter. As can be gathered from FIGS. 3*a* to 3*c*, on the inner wall of the first body part 21, guide rails 213 are provided along a circumference of the first hollow interior 211, wherein the guide rails 213 are stripe-like bars in different lengths and project from the inner wall of the first body part 21 towards the inside, i.e. towards a center or longitudinal axis LA common to all components of the fluid transfer device 1. Also, each one of the guide rails 213 can exhibit a bevel-like inclination at its end directed towards the first opening end 212 and beveled in regard to the inside, for ease of introducing and centering a BCT into the first hollow interior 211. Thereby, the tubular BCT, when introduced, is centered and aligned with its longitudinal axis to the longitudinal axis LA. In regard to the mentioned axial ratio, in the present case, the center axes of the main body 2, the connection assembly 3, the actuating member 4 as well as the optional spacer 5 all coincide. Thus, the longitudinal axis LA constitutes a common center axis of all components of the fluid transfer device 1 according to the presently described embodiment of the present invention, and, thus, of the fluid transfer device 1 itself.

In an outer wall of the first body part 21, which outer wall surrounds the first hollow interior 211, a notch 214 in the form of an elongated recess connecting the inside of the first body part 21, i.e. the first hollow interior 211, with the outside is provided, wherein the longitudinal axis of the notch 214 extends parallel, i.e. paraxial, to the longitudinal axis LA. Furthermore, in the outer wall of the first body part 21, an access window 215 in the form of an elongated recess connecting the inside of the first body part 21, i.e. the first hollow interior 211, with the outside is provided, wherein the longitudinal axis of the access window 215 extends parallel, i.e. paraxial, to the longitudinal axis LA. Here, a width of the notch 214 is smaller than a width of the access window 215, which, however, is merely a design feature and is not mandatory since both the notch 214 and the access window 215 could have similar dimensions without lacking any of their function, such as identical width. Furthermore, as an optional feature on the outside of the outer wall of the first body part 21, an engraving in the form of a standard BCT is provided, which engraving is also referred to as BCT side indicator 216. Thereby, a user can clearly identify the BCT side of the fluid transfer device 1 according to the presently described embodiment of the present invention. As an alternative, such BCT side indicator 216 can also be provided in the form of an imprint, a label, or the like. Similarly thereto, an engraving in the form of an exemplary BCB is provided as an optional feature on the outside of the outer wall of the second body part 22, which engraving is also referred to as BCB side indicator 226. Thereby, a user can clearly identify the BCB side of the fluid transfer device 1 vis-à-vis the BCT side.

On the inside of the first body part 21, the actuating member 4 as a per se separate component is inserted into the first hollow interior 211. The actuating member 4 is itself a hollow cylindrical or tubular member comprising a substantially cylindrical outer wall 41 and an abutting wall 42 arranged parallel to the partitioning wall 23. Here, the substantially cylindrical outer wall 41 of the actuating member 4 can be non-continuous, e.g. interrupted by longitudinal recesses extending over the entire longitudinal extent of the actuating member 4, wherein the abutting wall 42 connects the thus formed parts of the outer wall 41, see FIG. 1. Such recesses can be provided in correlation to the guide rails 213 of the first body part 21, e.g. as rotational stop for the actuating member 4. Further, the abutting wall 42 is arranged within the outer wall 41 with a certain distance from either longitudinal end of the actuating member 4, wherein a distance to a front end of the actuating member 4 directed towards the partitioning wall 23 is shorter than a distance to the opposing back end of the actuating member 4. Within the part of the actuating member 4 between its back end and the abutting wall 42, guide rails 43 can be provided in an inclined manner for ease of introducing and centering a BCT into the hollow interior of the actuating member 4 so that the tubular BCT, when introduced, is again centered and aligned with its longitudinal axis to the longitudinal axis LA, before abutting on a back surface of the abutting wall 42 directed towards the first open end 212. Also, the guide rails 43 can have a supporting function for the parts of the outerwall 41, i.e. as supportive bars. Similar to the guide rails 213 of the first body part 21, the guide rails 43 provided on the inside of the actuating member 4 are stripe-like bars projecting from the inner wall of the actuating member 4 towards the inside, i.e. towards a center or longitudinal axis LA of the first body part 21 and, thus, of the fluid transfer device 1. Each one of the guide rails 43 is provided in an inclined manner with its inclination, i.e. with an enlarging inner diameter, towards the back end of the actuating member 4. Furthermore, in the center of the abutting wall 42, a through-hole 421 is provided, see e.g. FIG. 3*b*, which through-hole 421 serves for passage of a first cannula part 311 and its first encasing member 32 through the abutting wall 42, which first cannula part 311 and first encasing member 32 are described in further detail below. On a front surface of the abutting wall 42 directed towards the partitioning wall 23, and around the through-hole 421, a circular ridge projects towards the partitioning wall 23, with the area between the edge of the through-hole 421 and the inner circumference of the ridge provides for a seat or seating area 422, see FIG. 3*c*, for loose engagement with a disc-like projection 323 of the first encasing member 32, also described in further detail below.

As can be gathered from FIG. 2, the actuating member 4 further comprises a stopper 44 in the form of a snap-fit joint at its front end directed towards the partitioning wall 23, wherein the stopper 44 is snapped into the notch 214 of the first body part 21. Thereby, after assembling the fluid transfer device 1, i.e. after inserting the actuating member 4 into the fluid transfer device 1, the actuating member 4 is prevented from accidentally falling out of the first hollow interior 211 in case the empty assembled fluid transfer device 1 is lifted and turned around its center. Furthermore, as can also be gathered from FIG. 2, the actuating member 4 can comprise a grip enhancer in the form of one or several ribs protruding from the outer circumference of the outer wall 41 of the actuating member 4 towards the outside. The grip enhancer 45 can protrude into the access window 215 of the first body part 21. By means of the grip enhancer 45, the user is able to firmly contact the actuating member 4 from the outside, in order to be able to securely actuate the actuating member 4, i.e. in order to move the actuating member 4 up and down within the first hollow interior 211. As an alternative, the grip enhancer 45 can also be implemented by means of incorporated anti-slip serrations, applied anti-slip labels or the like. Also, by means of the stopper 44 and/or the grip enhancer 45, both visible to the outside, the user can identify a moving state of the actuating member 4, if the actuating member 4 is in its initial position or in an activated state when moved towards the partitioning wall 23.

The actuating member 4 is arranged coaxially with the longitudinal axis LA in a movable manner, wherein a movement of the actuating member 4 within the first hollow interior 211 is a sliding movement, with a surface or circumference of the outer wall 41 of the actuating member 4 sliding along an inner wall surface or inner wall circumference of the first body part 21. Thus, during operation of the fluid transfer device 1, the actuating member 4 constitutes a BCT side interface portion of the fluid transfer device 1, since an introduced BCT abuts against the back surface of the abutting wall 42 as already described above, and as can be seen in e.g. FIGS. 4*a* to 4*c*. Now, with the actuating member 4 being arranged in a movable manner inside the first body part 21, and with the actuating member 4 thus constituting a movable BCT side interface portion of the fluid transfer device 1, compared to a stationary BCB side interface portion as described further below, the BCT side interface portion and the BCB side interface portion of the fluid transfer device 1 according to the presently described embodiment of the present invention can move relative to each another during a movement of the actuating member 4.

In regard to the stationary BCB side interface portion, as can be gathered from FIGS. 2 and 3*a* to 3*c*, the second body part 22 comprises at least one slot-like recess 225, also referred to as slot 225, within its second hollow interior 221 at its upper edge close to the second open end 222. Into the recess 225, a respective snap-fit feature 56 of the spacer 5 can snap into, in case the spacer 5 is to be attached to the main body 2 of the fluid transfer device 1 for assisting the second body part 22 in accommodating long-necked vessels, such as the BCB 91 of FIG. 5*a*. In this regard, see also FIGS. 3*a* and 4*a*, wherein both drawings show cases in which a BCB 91 with a long and thin bottle neck 911 is docket to the fluid transfer device 1 by means of the spacer 5. Thus, in order to connect the spacer 5 securely to the fluid transfer device 1, the snap-fit connection between the spacer 5 and the fluid transfer device 1 is implemented by means of the combination of at least one snap-fit feature 56 and a correspondingly-formed slot 225 provided at the upper edge of the second body part 22 close to the second open end 222. In order to provide a more secure attachment of the spacer 5 to the main body 2, two slots 225 can be provided, see FIG. 1, which two slots 225 can be arranged opposite from each other in the upper edge of the second body part 22, with two matching snap-fit features 56 provided at the spacer 5 in a corresponding manner. Also, in order to secure a steady attachment of the spacer 5 to the second body part 22, the spacer 5 consists of a an outer wall 51 divided by an outer rim 53 into two parts, the outer rim 53 projecting from the outer wall 51 in a ledge-like manner. Here, the outer rim 53 as well as an internal connecting wall 54 of the spacer 5 at the same or similar level as the outer rim 53 divide the spacer 5 into the mentioned two parts, wherein a part of the outer wall 51 of the spacer 5 directed towards the partitioning wall 23 is arranged within the second hollow interior 221, and the other part of the outer wall 51 of the spacer directed away from the partitioning wall 23 is arranged outside of the second body part 22. In an attached state, the outer rim 53 is abutted against an edge of the second open end 222. An edge of the other part of the outer wall 51 of the spacer 5 directed away from the partitioning wall 23 and arranged outside of the second body part 22 provides for an outer seat 511 used for seating engagement with the long and thin bottle neck 911 of the BCB 91, see FIGS. 3*a* and 4*a*, and the inner part of the outer wall 51 of the spacer 5 is arranged within the second hollow interior 221, further securing the steady attachment of the spacer 5 to the second body part 22.

Furthermore, the spacer 5 comprises an inner wall 52, which inner wall 52 is provided parallel to the outer wall 51 of the spacer 5 and is directed away from the partitioning wall 23 and arranged outside of the second body part 22, similar to the previously mentioned outer wall 51 of the spacer 5. The outer wall 51 and the inner wall 52 of the spacer 5 are connected by the connecting wall 54 of the spacer 5, and the inner wall 52 provides additional guidance and support for the long and thin bottle neck 911 of the BCB 91. Here, in order for the long and thin bottle neck 911 of the BCB 91 to pass through the spacer 5, the connecting wall 54 comprises a central through-hole 55, which through-hole 55 is coaxial to the second hollow interior 221, i.e. coaxial with the common longitudinal axis LA. Moreover, as can be gathered from e.g. FIGS. 2 and 3*a*, the second body part 22 also comprises within its second hollow interior 221 at least two snap-fit connectors 223 arranged opposite to each other, as well as two centering projections 224 arranged opposite to each other. Here, the centering projections 224 are useful for centering the long and thin bottle neck 911 of the BCB 91, or of any BCB, within the second body part 22, in addition to the inner wall 52 of the spacer 5, and the snap-fit connectors 223 are intended for establishing a snap-fit lock with the closed end of any BCB 91, 92, 93, independently of its neck shape, see FIGS. 3*a* to 3*c*.

Figure 3A:
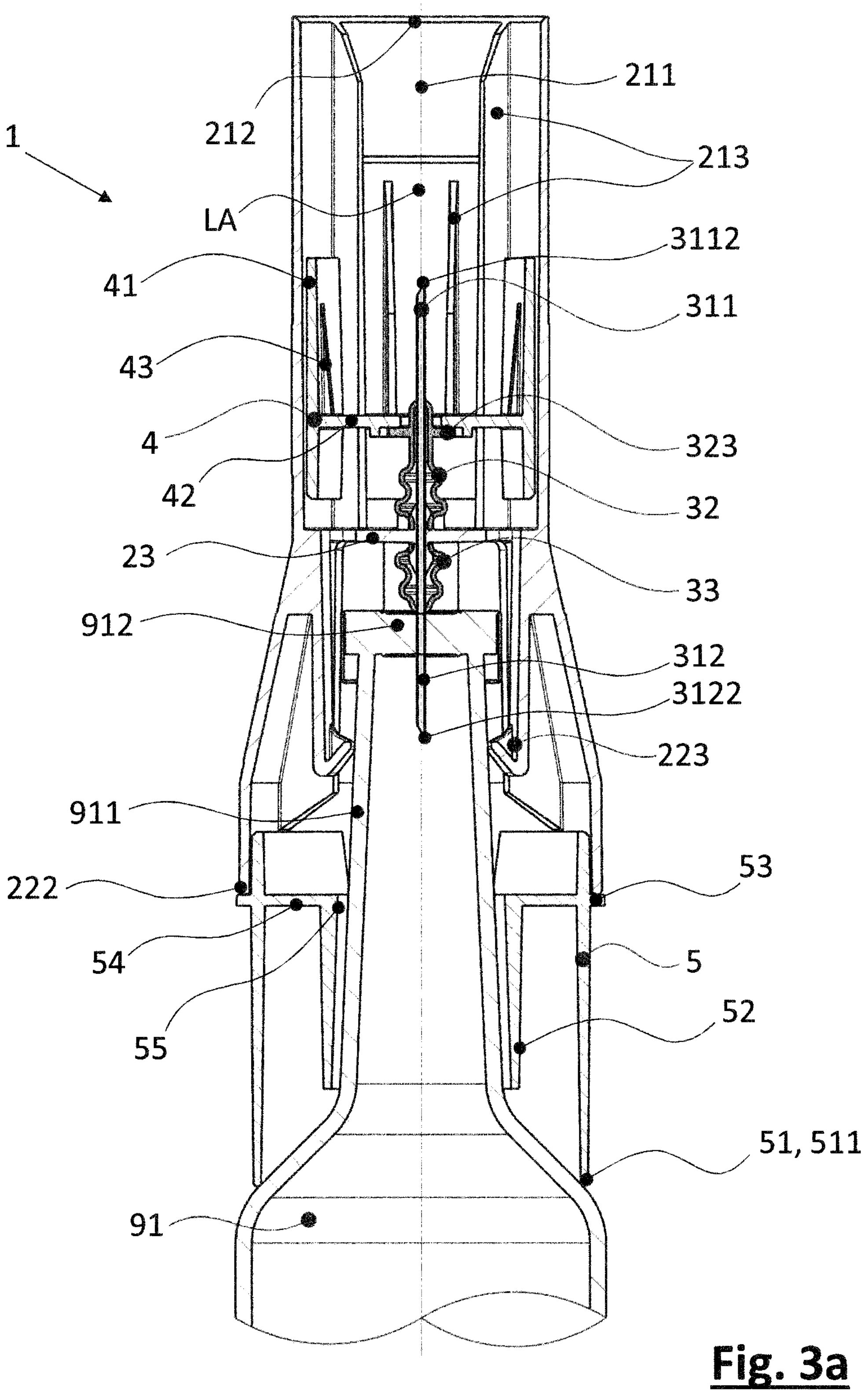
FIG. 3*a* is a schematic illustration of the fluid transfer device of FIGS. 1 and 2 in venting use with a BCB with a long and thin bottle neck as depicted in FIG. 5*a*, in a cross-sectional view.
Figure 3B:
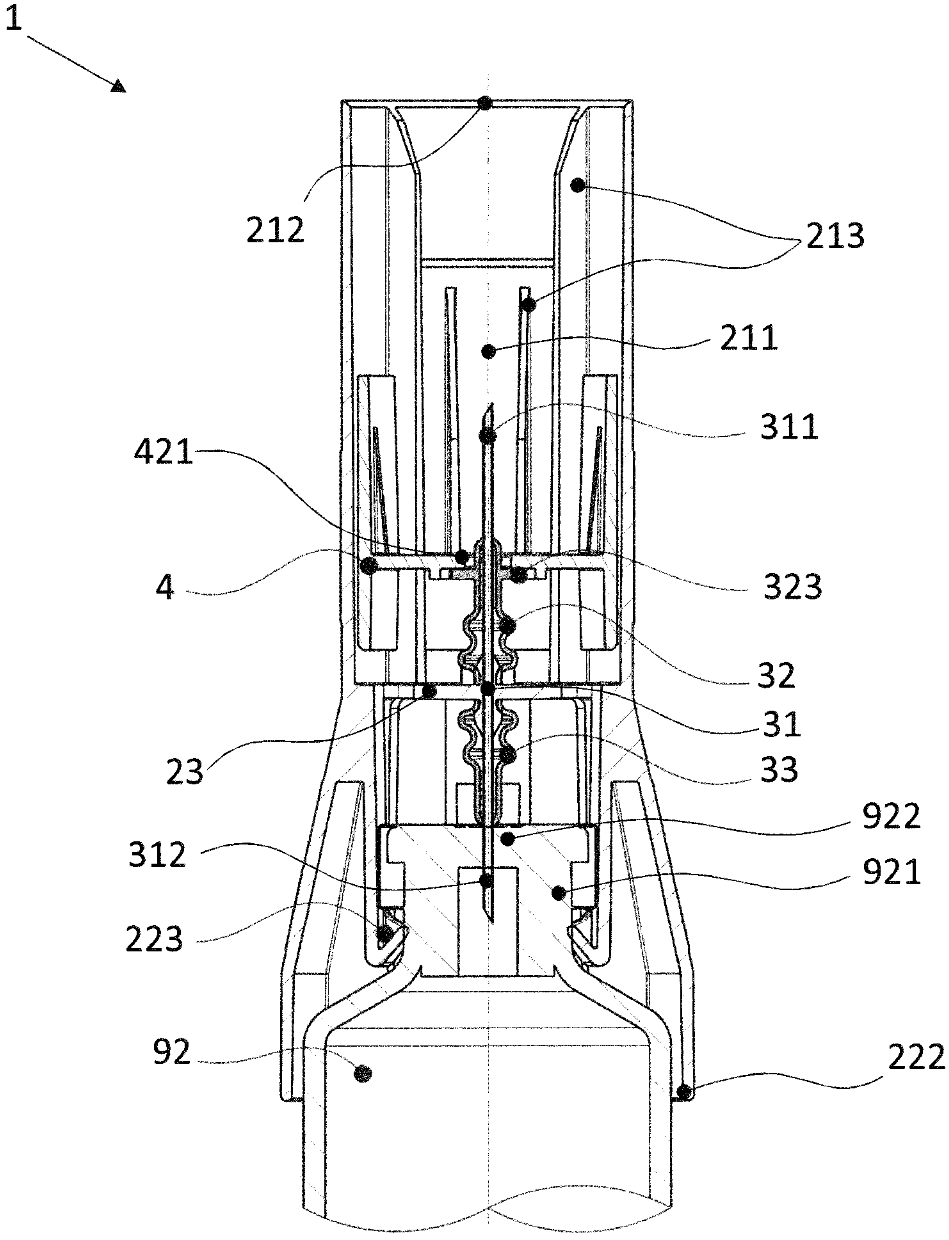
FIG. 3*b* is a schematic illustration of the fluid transfer device of FIGS. 1 and 2 in venting use with a BCB with a short bottle neck as depicted in FIG. 5*b*, in a cross-sectional view.
Figure 3C:
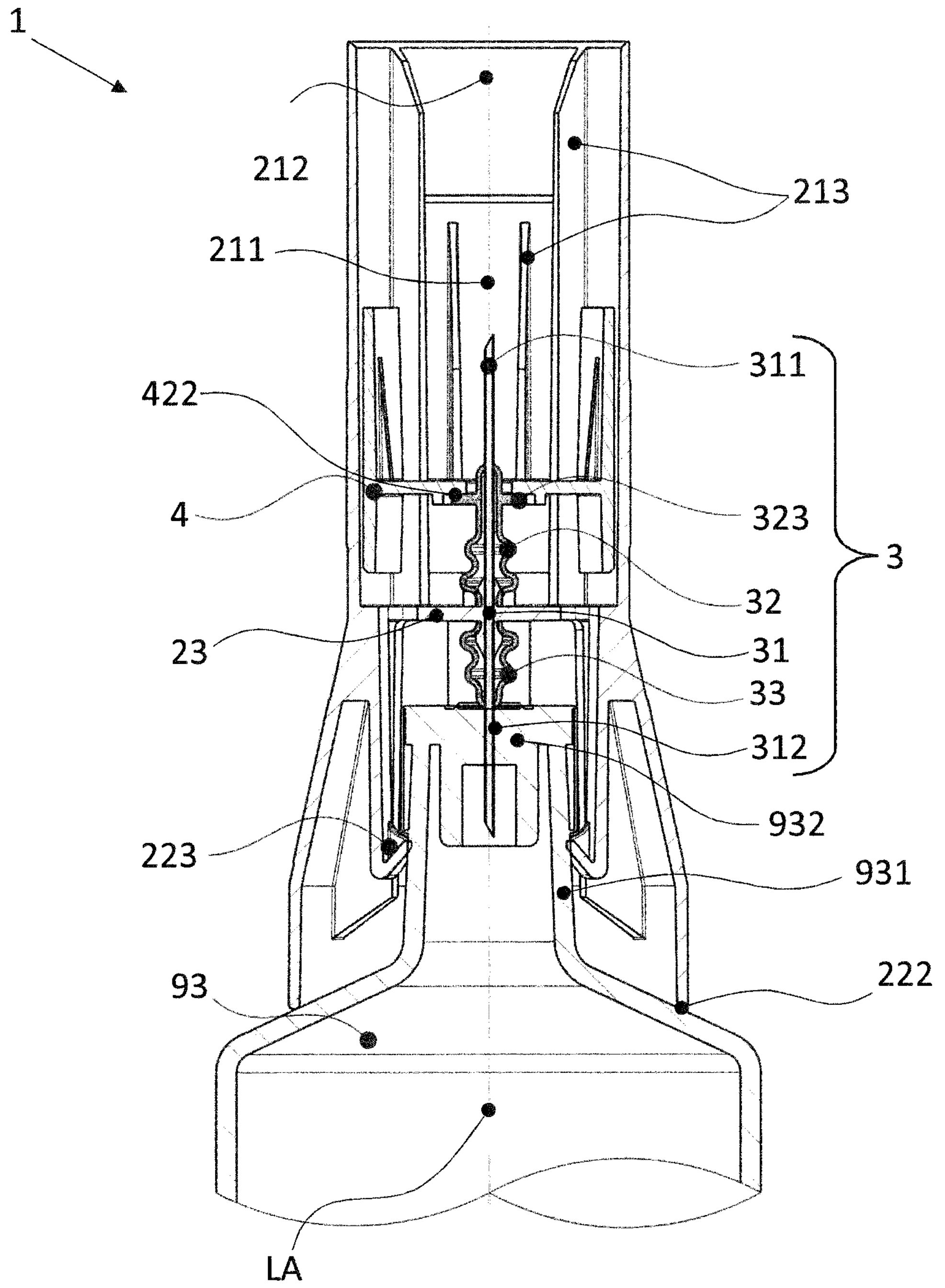
FIG. 3*c* is a schematic illustration of the fluid transfer device of FIGS. 1 and 2 in venting use with a BCB with a wide and short bottle neck as depicted in FIG. 5*c*, in a cross-sectional view.

As further component of the fluid transfer device 1 according to the presently described embodiment of the present invention, and as particularly depicted in FIG. 3*c*, the connection assembly 3 comprises a cannula 31 with two open ends, i.e. a continuous double-ended cannula 31, which cannula 31 is integrally formed with the partitioning wall 23 in a way such that the center axis of the cannula 31 coincides with the center axis of the main body 2, i.e. with the common longitudinal axis LA. In this regard, the cannula 31 is arranged with its longitudinal middle within the partitioning wall 23, thereby dividing the cannula 31 into the first cannula part 311 arranged within the first hollow interior 211 and into a second cannula part 312 arranged within the second hollow interior 221. The first cannula part 311, or better its tip 3112, is intended for piercing the septum of a BCT inserted into the first hollow interior 211 and received by the abutting wall 42 of the movable actuating member 4. Similarly, the second cannula part 312, or better its tip 3122, is intended for piercing the septum of a BCB inserted into the second hollow interior 221. The first cannula part 311 is arranged within the first hollow interior 211 in a way such that the tip 3112 of the first cannula part 311 is recessed compared to the first open end 212, i.e. the first body part 21 extends further from the partitioning wall 23 than the tip 3112 of the first cannula part 311. Similarly, the second cannula part 312 is arranged within the second hollow interior 221 in a way such that the tip 3122 of the second cannula part 312 is recessed compared to the second open end 222, i.e. the second body part 22 extends further from the partitioning wall 23 than the tip 3122 of the second cannula part 312. The first cannula part 311 is covered by the already mentioned first encasing member 32, wherein, in a state in which no BCB is docked to the fluid transfer device 1 as depicted in FIG. 2, the first encasing member 32 together with the covered first cannula part 311 project into the first hollow interior 211. The second cannula part 312 is covered by a second encasing member 33, wherein, in a state in which no BCT is docked to the fluid transfer device 1 as depicted in FIGS. 2 and 3*a* to 3*c*, the second encasing member 33 together with the covered second cannula part 312 project into the second hollow interior 221 and, thereby, through the through-hole 421 of the actuating member 4. Both the first encasing member 32 and the second encasing member 33 are attached to the respective cannula part 311, 312 by means of a force-fit connection, see e.g. FIGS. 4*a* and 4*b*. In further detail, during assembling the fluid transfer device 1, a socket 321 of the first encasing member 32 arranged adjacent the longitudinal middle of the cannula 31 held by the partitioning wall 23 is pushed over a circular bulge 3111 provided at a base of the first cannula part 311. Thereby, due to the resilience of the first encasing member 32, a forced connection by press-fit is achieved, i.e. a frictional connection between the bulge 3111 and the socket 321 of the first encasing member 32. Similarly thereto, a socket 331 of the second encasing member 33 arranged adjacent the longitudinal middle of the cannula 31 held by the partitioning wall 23 is pushed over a circular bulge 3121 provided at a base of the second cannula part 312. Thereby, again due to the resilience of the second encasing member 33, a forced connection by press-fit is achieved, i.e. a frictional connection between the bulge 3121 and the socket 331 of the second encasing member 33. In doing so, the first and second encasing members 32, 33 are securely attached to the cannula parts 311, 312.

As already mentioned above when describing the structure of the actuating member 4 of the fluid transfer device 1 according to the presently described embodiment of the present invention, the first encasing member 32 additionally comprises the disc-like projection 323 provided in an integral manner adjacent to a tip 322 of the first encasing member 32, which tip 322 is opposed to its socket 321. The actuating member 4 is in seat-engaging contact with the first encasing member 32 by means of the disc-like projection 323 integrally formed with the first encasing member 32 abutting against the seat 422, thereby forming a loose engagement with the disc-like projection 323 of the first encasing member 32. Thus, when pressing the actuating member 4 in a direction towards the partitioning wall 23, the disc-like projection 323 and, thus, the first encasing member 32 can be deformingly compressed in a collapsing manner, thereby urging the tip 322 of the first encasing member 32 towards its socket 321 and, thus, towards the sharp tip 3112 of the first cannula part 311. In doing so, i.e. by the mutual movement of the actuating member 4 and the tip 322 of the first encasing member 32, tip 322 of the first encasing member 32 is urged onto and over the sharp tip 3112 of the first cannula part 311, thereby piercing the tip 322 of the first encasing member 32 by means of the sharp tip 3112 of the first cannula part 311.

Figure 4A:
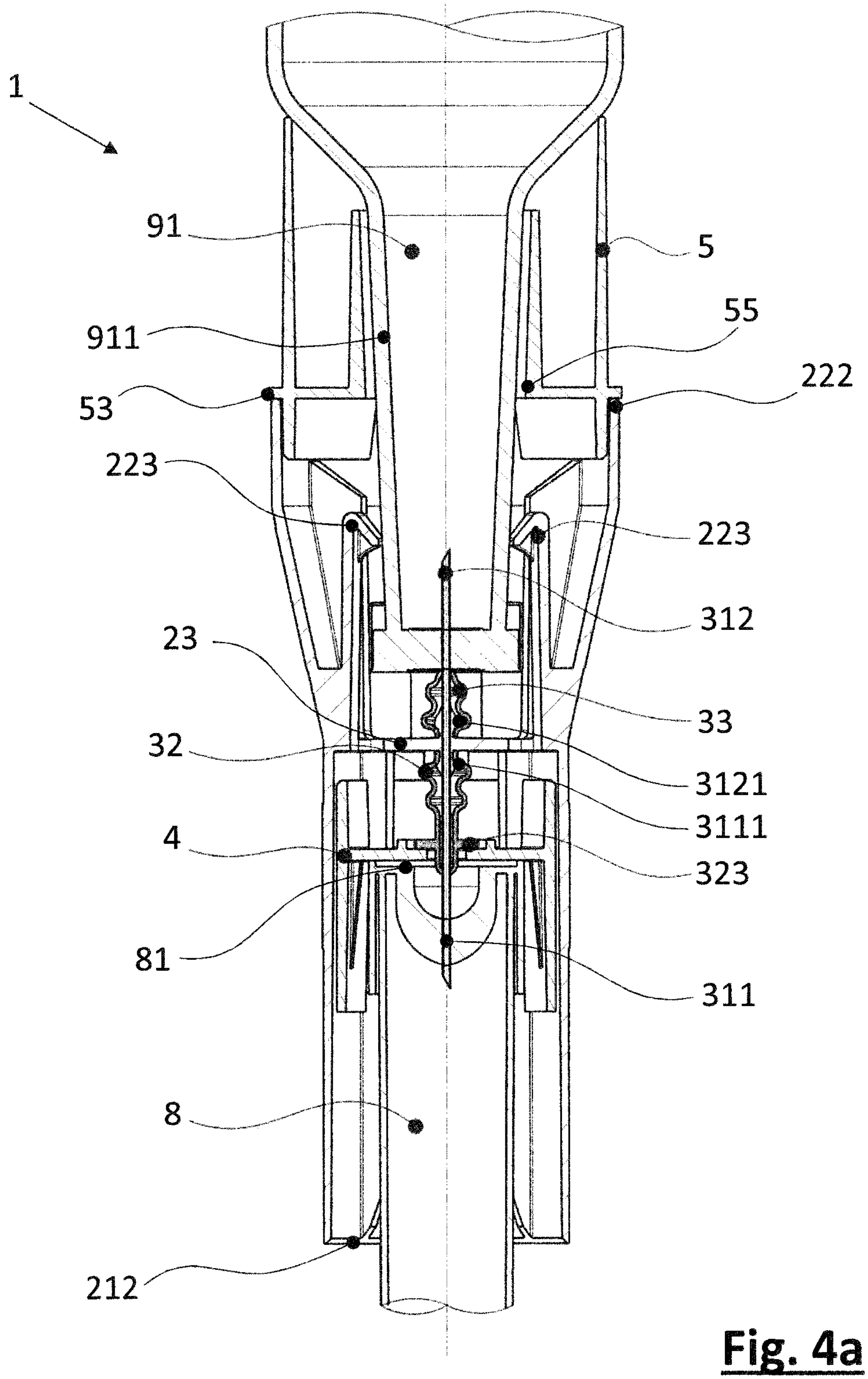
FIG. 4*a* is a schematic illustration of the fluid transfer device of FIGS. 1 and 2 in fluid transfer use with a BCB with a long and thin bottle neck as depicted in FIG. 5*a*, and with a standard BCT, in a cross-sectional view.
Figure 4B:
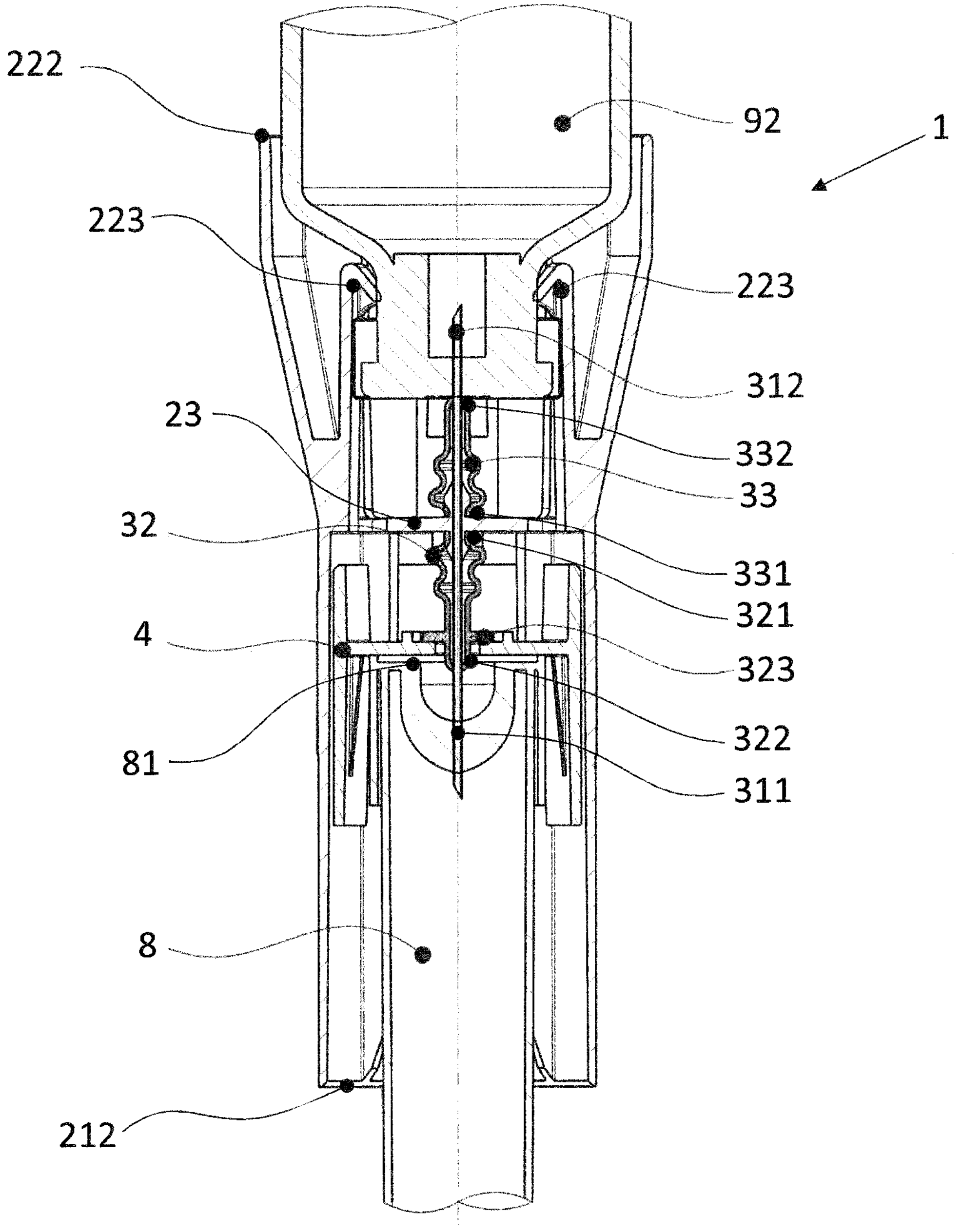
FIG. 4*b* is a schematic illustration of the fluid transfer device of FIGS. 1 and 2 in fluid transfer use with a BCB with a short bottle neck as depicted in FIG. 5*b*, and with a standard BCT, in a cross-sectional view.
Figure 4C:
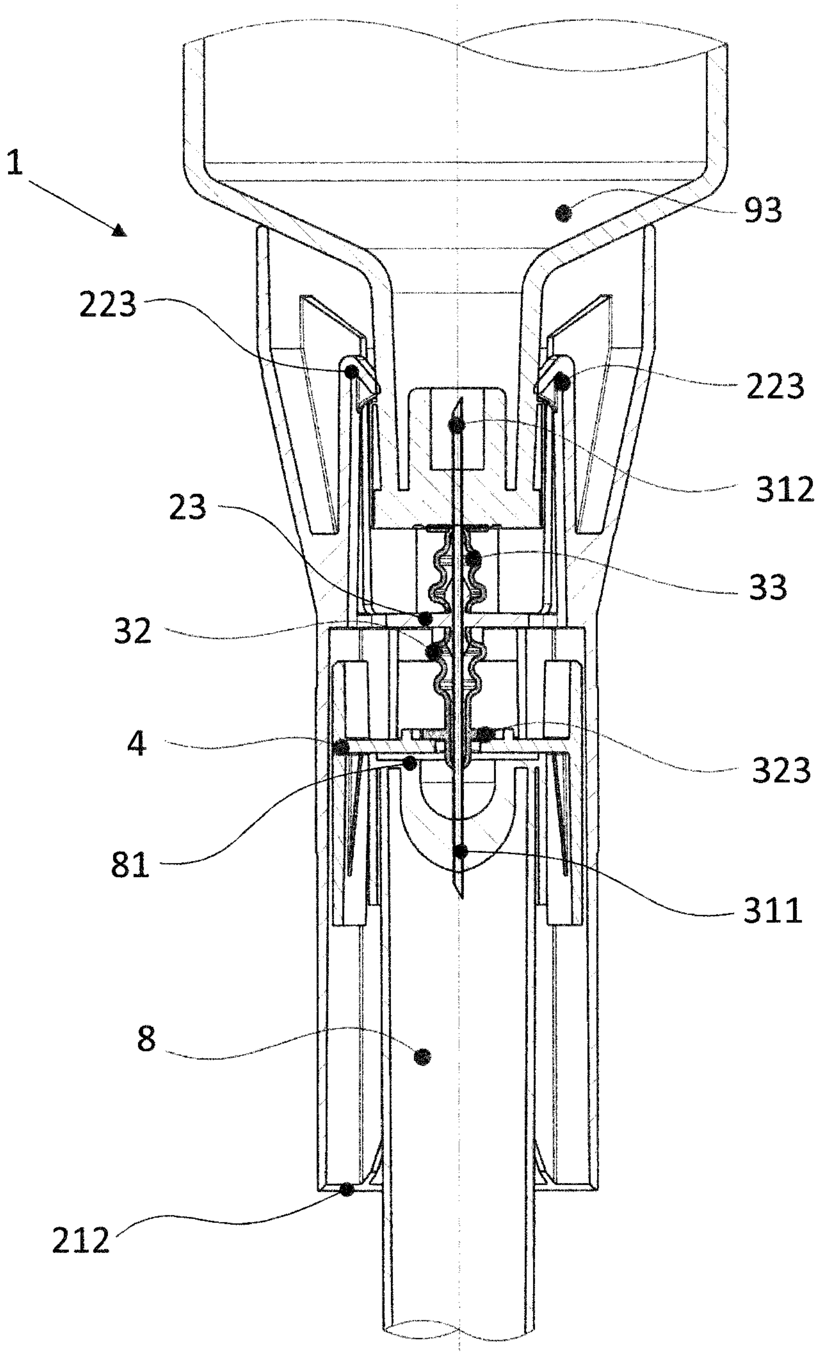
FIG. 4*c* is a schematic illustration of the fluid transfer device of FIGS. 1 and 2 in fluid transfer use with a BCB with a wide and short bottle neck as depicted in FIG. 5*c*, and with a standard BCT, in a cross-sectional view.
Figure 5A:
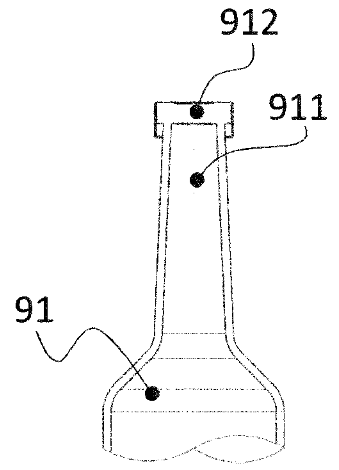
FIGS. 5*a-c* are schematic illustrations of different kinds of known blood culture bottles, BCBs, in a cross-sectional detail view, with a BCB with a long and thin bottle neck depicted in FIG. 5*a*, a BCB with a short bottle neck depicted in FIG. 5*b*, and a BCB with a wide and short bottle neck depicted in FIG. 5*c*.
Figure 5B:
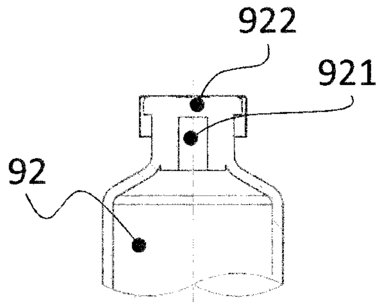
Figure 5C:
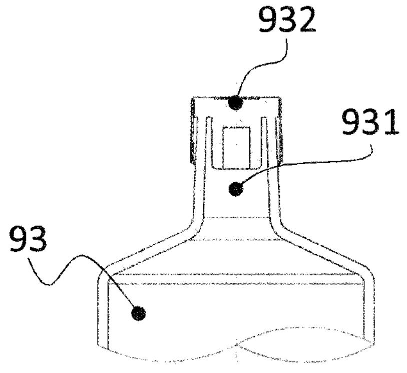

The use of the fluid transfer device 1 according to the presently described embodiment of the present invention is generally illustrated by the sequence of FIGS. 3*a* and 4*a* for the interconnection of a BCB 91 with a long and thin bottle neck 911 and a standard BCT 8, by the sequence of FIGS. 3*b* and 4*b* for the interconnection of a BCB 92 with a short bottle neck 921 and a standard BCT 8, and by the sequence of FIGS. 3*c* and 4*c* for the interconnection of a BCB 93 with a wide and short bottle neck 931 and a standard BCT 8. In further detail, in FIG. 3*a*, the BCB 91 with the long and thin bottle neck 911 has already been docked onto the BCB side interface portion of the fluid transfer device 1 using the spacer 5, with the long and thin bottle neck 911 being guided and held by the inner wall 52 of the spacer 5 and locked by the snap-fit connectors 223, wherein the optional second encasing member 33 has been pushed back by the BCB 91 moving against it, and the second cannula part 312 has pierced a tip 332 of the second encasing member 33 first and then the septum 912 of the BCB 91, thus generating a connection between the interior of the cannula 31 and the interior of the BCB 91. Furthermore, on the other side of the fluid transfer device 1, above the BCB 91, the actuating member 4 is pushed by the user from its initial i.e. non-actuated position towards the partitioning wall 23 and is held in this actuated position, thereby piercing the tip 322 of the first encasing member 32 by means of the sharp tip 3112 of the first cannula part 311 and exhibiting the tip 3112 of the first cannula part 311 to the environment. In doing so, a fluid path between the environment and the interior of the BCB 91 is achieved, resulting in a venting state of the BCB 91 for optional venting in case an overpressure exists within the BCB 91. Here, the user of the fluid transfer device 1 of the present invention can control the process of pressure release, e.g. in a stepwise manner or all at once. After venting, the actuating member 4 can be fully released, and the resilience of the first encasing member 32 automatically restores the original form of the first encasing member 32, thereby immediately re-encasing the tip 3112 of the first cannula part 311, thus preventing dripping of residual fluid remaining in the first cannula part 311 from the fluid transfer device 1. Subsequently, as described in regard to FIG. 4*a*, the BCB 91 remains docked to the BCB side interface portion of the fluid transfer device 1, and a standard BCT 8 is docked to the BCT side interface portion of the fluid transfer device 1, wherein the fluid transfer device 1 is positioned by a user so that the BCB 91 is arranged upside down above the BCT 8. The abutting wall 42 of the actuating member 4 receives the BCT 8, and the actuating member 4 is pushed towards the partitioning wall 23 together with the inserted BCT 8. In doing so, the tip 322 of the first encasing member 32 is again pierced by means of the sharp tip 3112 of the first cannula part 311, and the sharp tip 3112 of the first cannula part 311 pierces the septum 81 of the BCT 8, thereby establishing a fluid connection between the interior of the BCB 91 and the interior of the BCT 8 by means of the fluid transfer device 1. Since the standard BCT 8 is usually vacuumized, fluid content of the BCB 91 is drawn into the BCT 8, wherein an arrangement of the BCB 91 vertically over the BCT 8 supports the fluid transfer from the BCB 91 into the BCT 8 and assists in avoiding the entering of air.

In regard to the use of the fluid transfer device 1 without the spacer 5, and in view of FIG. 3*b*, a BCB 92 with the short bottle neck 921 has already been docked onto the BCB side interface portion of the fluid transfer device 1, with the short bottle neck 921 being guided by the centering projections 224 and locked by the snap-fit connectors 223, wherein the optional second encasing member 33 has been pushed back by means of the BCB 92 and the second cannula part 312 has pierced the septum 922 of the BCB 92, thus generating a connection between the interior of the cannula 31 and the interior of the BCB 92. Furthermore, on the other side of the fluid transfer device 1, the actuating member 4 is pushed by the user from its initial i.e. non-actuated position towards the partitioning wall 23 and is held in this actuated position, thereby piercing the tip 322 of the first encasing member 32 by means of the sharp tip 3112 of the first cannula part 311 and exhibiting the tip 3112 of the first cannula part 311 to the environment. In doing so, a fluid path between the environment and the interior of the BCB 92 is achieved, resulting in a venting state of the BCB 92 for venting in case an overpressure exists within the BCB 92. Here again, the user of the fluid transfer device 1 of the present invention can control the process of pressure release, e.g. in a stepwise manner or all at once. After venting, the actuating member 4 can be fully released, and the resilience of the first encasing member 32 automatically restores the original form of the first encasing member 32, thereby immediately re-encasing the tip 3112 of the first cannula part 311, thus preventing dripping of residual fluid remaining in the first cannula part 311 from the fluid transfer device 1. Subsequently, as described in regard to FIG. 4*b*, the BCB 92 remains docked to the BCB side interface portion of the fluid transfer device 1, and a standard BCT 8 is docked to the BCT side interface portion of the fluid transfer device 1, wherein the fluid transfer device 1 is positioned by a user so that the BCB 92 is arranged upside down above the BCT 8. Here, the abutting wall 42 of the actuating member 4 receives the BCT 8, and the actuating member 4 is pushed towards the partitioning wall 23 together with the inserted BCT 8. In doing so, the tip 322 of the first encasing member 32 is again pierced by means of the sharp tip 3112 of the first cannula part 311, and the sharp tip 3112 of the first cannula part 311 pierces the septum 81 of the BCT 8, thereby establishing a fluid connection between the interior of the BCB 92 and the interior of the BCT 8 by means of the fluid transfer device 1. Since the standard BCT 8 is usually vacuumized, fluid content of the BCB 92 is drawn into the BCT 8, wherein an arrangement of the BCB 92 vertically over the BCT 8 can support the fluid transfer from the BCB 92 into the BCT 8.

Similarly to the above in regard to the use of the fluid transfer device 1 with the BCB 92 with the short bottle neck, and in view of FIG. 3*c*, the BCB 93 with the wide and short bottle neck 931 has already been docked onto the BCB side interface portion of the fluid transfer device 1, with the wide and short bottle neck 931 being guided by the centering projections 224 and locked by the snap-fit connectors 223, wherein the optional second encasing member 33 has been pushed back by means of the BCB 93 and the second cannula part 312 has pierced the septum 922 of the BCB 93, thus generating a connection between the interior of the cannula 31 and the interior of the BCB 93. Furthermore, on the other side of the fluid transfer device 1, the actuating member 4 is pushed by the user from its initial i.e. non-actuated position towards the partitioning wall 23 and is held in this actuated position, thereby piercing the tip 322 of the first encasing member 32 by means of the sharp tip 3112 of the first cannula part 311 and exhibiting the tip 3112 of the first cannula part 311 to the environment. In doing so, a fluid path between the environment and the interior of the BCB 93 is achieved, resulting in a venting state of the BCB 93 for venting in case an overpressure exists within the BCB 93. Here again, the user of the fluid transfer device 1 of the present invention can control the process of pressure release, e.g. in a stepwise manner or all at once. After venting, the actuating member 4 can be fully released, and the resilience of the first encasing member 32 automatically restores the original form of the first encasing member 32, thereby immediately re-encasing the tip 3112 of the first cannula part 311, thus preventing dripping of residual fluid remaining in the first cannula part 311 from the fluid transfer device 1. Subsequently, as described in regard to FIG. 4*c*, the BCB 93 remains docked to the BCB side interface portion of the fluid transfer device 1, and a standard BCT 8 is docked to the BCT side interface portion of the fluid transfer device 1, wherein the fluid transfer device 1 is positioned by a user so that the BCB 93 is arranged upside down above the BCT 8. Here again, the abutting wall 42 of the actuating member 4 receives the BCT 8, and the actuating member 4 is pushed towards the partitioning wall 23 together with the inserted BCT 8. In doing so, the tip 322 of the first encasing member 32 is again pierced by means of the sharp tip 3112 of the first cannula part 311, and the sharp tip 3112 of the first cannula part 311 pierces the septum 81 of the BCT 8, thereby establishing a fluid connection between the interior of the BCB 93 and the interior of the BCT 8 by means of the fluid transfer device 1. Since the standard BCT 8 is usually vacuumized, fluid content of the BCB 93 is drawn into the BCT 8, wherein an arrangement of the BCB 93 vertically over the BCT 8 can support the fluid transfer from the BCB 93 into the BCT 8.

Also, in regard to the above, several BCTs 8 can be used for one and the same BCB 91, 92, 93, since a BCB 91, 92, 93 usually contains more fluid than is necessary for one BCT 8. Thus, the fluid transfer device 1 can be used with one BCB 91, 92, 93 but with several BCTs 8, wherein the BCB 91, 92, 93 can be vented in between changing of BCTs 8.

While the current invention has been described in relation to its specific embodiments, it is to be understood that this description is for illustrative purposes only. Accordingly, it is intended that the invention be limited only by the scope of the claims appended hereto.

The invention claimed is:

1. A fluid transfer device (1) for interconnecting vessels (8; 91; 92; 93), the fluid transfer device (1) comprising:

a main body (2) with (a) a first body part (21) providing a first hollow interior (211) merging into a first open end (212) for receiving a fluid obtaining vessel (8) and (b) a second body part (22) providing a second hollow interior (221) merging into a second open end (222) for receiving a fluid supplying vessel (91; 92; 93) the first body part 21 and the second body part 22 separated by a common partitioning wall 23;

a connection assembly (3) with (a) a double-ended cannula (31) for connecting the first hollow interior (211) with the second hollow interior (221), the cannula (31) integrally formed with the partitioning wall (23) and including a first cannula part (311), and (bb) a first encasing member (32) encasing the first cannula part (311) arranged within the first hollow interior (211), the first encasing member (32) including a projection (323) that laterally projects outward from the first encasing member (32); and an actuating member (4) provided inside the first hollow interior (211), the actuating member (4) being configured to contact with the first encasing member (32) during a movement of the actuating member (4) towards the second body part (22) to cause piercing of the first encasing member (32) by the cannula (31), wherein the actuating member (4) includes a seating area (422) sized to form an engagement with the projection (323) during the movement of the actuating member (4) towards the second body part (22).

2. The fluid transfer device (1) of claim 1, wherein the movement of the actuating member (4) within the first hollow interior (211) is a sliding movement of an outer circumference of the actuating member (4) within an inner circumference of the first body part (21), the actuating member (4) is operable from an outside of the fluid transfer device (1), preferably in a manual manner by a user, and/or the movement of the actuating member (4) within the first hollow interior (211) is restricted by means of a stopper (44) riding in a notch (214) provided in the first body part (21), the notch (214) having a predetermined length.

3. The fluid transfer device (1) of claim 1, wherein the actuating member (4) is configured to contact with the first encasing member (32) by means of the seating area (422) forming the engagement with the projection (323).

4. The fluid transfer device (1) of claim 1, wherein the second body part (22) is adapted to receive fluid supplying vessels (91; 92; 93) of different shapes and dimensions, wherein the second body part (22) comprises at least two cantilever snap-fit connectors (223) and/or at least two projections (224) for providing a centering clip; and/or the fluid transfer device (1) further comprises a spacer (5) connectable to the second open end (222), preferably by means of a snap-fit connection (225, 56), wherein the connected spacer (5) assists the second body part (22) in accommodating long-necked vials (91).

5. The fluid transfer device (1) of claim 1, wherein the connection assembly (3) further comprises a second encasing member (33) encasing a second cannula part (312) arranged within the second hollow interior (221).

6. The fluid transfer device (1) of claim 1, wherein the first encasing member (32) is attached to the cannula (31) by means of a force-fit connection (3111, 321; 3121, 331), and/or the first encasing member (32) is made of resilient material for acting as a seal around a piercing site in its compressed state, and, after being released, as a flexible spring element restoring its original form for encasing a respective cannula tip (3112, 3122).

7. The fluid transfer device (1) of claim 1, wherein the first open end (212), the second open end (222); and the connection assembly (3) are arranged coaxially with a longitudinal axis of the main body (2), the longitudinal axis of the main body (2) being a common longitudinal axis shared by at least the actuating member (4).

8. The fluid transfer device (1) of claim 1, wherein the first body part (21), the second body part (22) and/or the actuating member (4) are made of transparent material, and/or the fluid transfer device (1) includes at least one cylindrical component, wherein an outer diameter of the second body part (22) is broadening in a direction away from the first body part (21).

9. The fluid transfer device (1) of claim 1, wherein the fluid transfer device (1) is an adapter for interconnecting vessels (8; 91; 92; 93) of different types for sample transfer, and/or the actuating member (4) is configured for venting the fluid supplying vessel (91; 92; 93).

10. The fluid transfer device (1) of claim 1, wherein the main body (2) and the cannula (31) of the connection assembly (3) are integrally manufactured by injection molding.

11. The fluid transfer device (1) of claim 1, wherein the actuating member (4) includes an abutting wall (42) arranged parallel to and spaced at a distance from the partitioning wall (23), and the seating area (422) is provided on a surface of the abutting wall (42) facing the partitioning wall (23).

12. The fluid transfer device (1) of claim 11, wherein the seating area (422) is shaped as a circular ring that surrounds a through-hole (421) at the center the abutting wall (42), the projection (323) is shaped as a disc that projects outward, in a lateral direction, from the first encasing member (32), and the through-hole (421) is sized to allow for passage of (a) the first cannula part (311) and (b) at least a portion of the first encasing member (32), through the abutting wall (42) and into the first hollow interior (211), upon the seating area (422) forming the engagement with the projection (323).

13. The fluid transfer device (1) of claim 11, wherein the surface of the abutting wall (42) facing the partitioning wall (23) includes a circular ridge that projects towards the partitioning wall (23), the circular ridge having a circumference that surrounds the seating area (422), and the projection (323) is configured to be at least partially enclosed by the circular ridge, in a lateral direction, upon the projection (323) forming the engagement with the seating area (422).

14. A fluid transfer device (1) for interconnecting vessels (8; 91; 92; 93), the fluid transfer device (1) comprising:

a main body (2) with (a) a first body part (21) providing a first hollow interior (211) merging into a first open end (212) for receiving a fluid obtaining vessel (8) and (b) a second body part (22) providing a second hollow interior (221) merging into a second open end (222) for receiving a fluid supplying vessel (91; 92; 93);

a connection assembly (3) with (a) a double-ended cannula (31) for connecting the first hollow interior (211) with the second hollow interior (221), the cannula (31) including a first cannula part (311), and (b) a first encasing member (32) encasing the first cannula part (311) arranged within the first hollow interior (211); and an actuating member (4) provided inside the first hollow interior (211), the actuating member (4) being configured to contact with the first encasing member (32) during a movement of the actuating member (4) towards the second body part (22) to cause piercing of the first encasing member (32) by the cannula (31), wherein the actuating member (4), the first encasing member (32), and the cannula (31) are arranged on a common longitudinal axis.

15. The fluid transfer device (1) of claim 14, wherein the actuating member (4) and the first hollow interior (211) have mutually mating shapes that (a) are centered on the common longitudinal axis and (b) provide for a sliding movement of the actuating member (4), along the common longitudinal axis, within the first hollow interior (211), and the movement of the actuating member (4) towards the second body part (22) includes the sliding movement to thereby cause piercing of the first encasing member (32) by the cannula (31).

* * * * *